(12) United States Patent
Gumm et al.

(10) Patent No.: US 10,471,359 B2
(45) Date of Patent: Nov. 12, 2019

(54) GAME AND METHOD OF PLAYING THE SAME

(71) Applicants: William Gumm, Colleyville, TX (US); Gabe von Ruden, Colleyville, TX (US)

(72) Inventors: William Gumm, Colleyville, TX (US); Gabe von Ruden, Colleyville, TX (US)

( * ) Notice: Subject to any disclaimer, the term of this patent is extended or adjusted under 35 U.S.C. 154(b) by 241 days.

(21) Appl. No.: 15/453,844

(22) Filed: Mar. 8, 2017

(65) Prior Publication Data
US 2018/0256987 A1    Sep. 13, 2018

(51) Int. Cl.
*A63F 13/828*    (2014.01)
*A63F 13/67*    (2014.01)
*A63F 13/65*    (2014.01)
*A63F 13/335*    (2014.01)
*A63F 13/332*    (2014.01)

(52) U.S. Cl.
CPC .......... *A63F 13/828* (2014.09); *A63F 13/332* (2014.09); *A63F 13/335* (2014.09); *A63F 13/65* (2014.09); *A63F 13/67* (2014.09); *A63F 2300/8052* (2013.01)

(58) Field of Classification Search
None
See application file for complete search history.

(56) References Cited

U.S. PATENT DOCUMENTS

| | | | |
|---|---|---|---|
| 2006/0252476 A1* | 11/2006 | Bahou | A63F 13/12 463/4 |
| 2010/0197374 A1* | 8/2010 | Koivisto | A63F 13/12 463/4 |
| 2014/0274245 A1* | 9/2014 | Stickel | A63F 13/65 463/9 |
| 2015/0065257 A1* | 3/2015 | Jolliffe | A63F 13/828 463/43 |
| 2015/0360133 A1* | 12/2015 | MacCallum | A63F 13/828 463/42 |
| 2017/0001120 A1* | 1/2017 | Mueller | A63F 13/65 |
| 2017/0197151 A1* | 7/2017 | Kuklok | A63F 13/828 |

* cited by examiner

*Primary Examiner* — Sunit Pandya
(74) *Attorney, Agent, or Firm* — Omni Legal Group; Omid E. Khalifeh (57) ABSTRACT

A system and method for a fantasy game are provided. In particular, the system and method enables one or more users to draft fantasy players based on any qualifying real-life person, object, or thing onto a roster, create a lineup based on the roster, and use the lineup to compete against other users. The system and method may utilize a deep learning algorithm that may update in real time to award points. At the conclusion of a season, the present invention may provide for two rounds of playoffs, after which the present invention may declare an overall winner and a winner for a particular category.

10 Claims, 5 Drawing Sheets

GAME AND METHOD OF PLAYING THE SAME

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to fantasy league games and, more particularly, to a system and method for a fantasy game having selectable lineups, variable player values, and user rankings that may be used to create a league and determine a league winner.

BACKGROUND

In fantasy leagues, such as fantasy football, each user is usually the manager of a team comprised of fictional representations of real-life persons, most commonly players in a sport. Typically, each team exists within a league of other users similarly managing their own teams. To build their team, users "draft" fictional "fantasy" players that correspond to real-life players. The user then selects a certain number of fantasy players from the user's roster to "start" and others to "bench" (not start). The list of starting fantasy players may be referred to as a "lineup." Most commonly, a user's lineup is matched up against another user's lineup on a recurring basis, for example weekly, over the course of a specified period of time generally referred to as a "season." For each matchup, the fantasy players on each user's lineup are awarded points based on the performance of the real-life player to whom the fantasy player corresponds. Generally speaking, the user whose lineup was awarded the most points wins the matchup.

Generally, fantasy sport seasons reflect real sports' actual seasons. For example, if the fantasy sport is football, where a team usually plays one team per week and the season culminates in a single winner, the corresponding fantasy football league usually also pits a user against one other user per week and the users' performances over the course of the season determines which team is the winner.

A variety of fantasy games exist on the market, including those designed to work on desktop computers, mobile phones, or tablets. There are many variations on fantasy games, including how points are scored, how teams are formed, how the teams in each league play each other, and league rules. However, the problem of optimizing the fantasy sports experience remains unsolved.

One attempt to optimize the fantasy sports experience can be seen in U.S. Patent Application Publication No. 2010/0210330 A1 filed by Fleming, which generally discloses a fantasy sports system and method aimed at optimizing the draft process. Unfortunately, this disclosure fails to provide for a draft process that assigns a value to each player, wherein the value changes over the course of the season based on the player's performance. Moreover, this disclosure does not allow a user to construct a lineup from players of more than one sport.

Another attempt to optimize the fantasy sports experience can be seeing in U.S. Pat. No. 7,699,707 to Bahou, which generally discloses a fantasy sports system and method aimed at optimizing the scoring process. While this disclosure does generally provide for a near-real-time scoring system, this disclosure fails to provide for a deep-learning algorithm that provides real-time scoring information.

Yet another attempt to optimize the fantasy sports experience can be seen in U.S. Pat. No. 7,614,944 to Hughes, which generally discloses a fantasy sports system and method aimed at optimizing the league play element. While this disclosure does generally provide for a multi-level fantasy sports league experience, this disclosure fails to provide for a "bullpen" or inactive league level that incentivizes players to get back in the game.

Still, none of these in existence comprise the beneficial characteristics described in the following disclosure. Thus, there remains a need for a system and method for a fantasy game system and method that optimizes the draft process, the points scoring system, and the manner in which users move up or down through better or worse leagues, respectively, among other benefits.

SUMMARY

The present disclosure is directed to a system and method for a fantasy game that allows a user to draft fantasy players that correspond to real-life persons or objects, create a lineup based on these fantasy players, and compete against other users' lineups or lineups generated by the present invention. In some embodiments, a lineup may accrue points based, in whole or in part, on one or more behaviors or results attributed to the real-life person or object, and the points may be awarded according to a system updated in real time by a deep learning algorithm.

It is contemplated that in certain embodiments, the user's status within the present invention's gameplay may be associated with the user's roster, and as such in the gameplay context the present disclosure may at times use the terms "user," "user's roster," "roster," and "team" interchangeably. Such interchangeability is not contemplated, however, when the present disclosure's context suggests otherwise.

It is contemplated that in certain embodiments, each lineup may be associated with a roster, and each roster may be assigned to a tier within a division. As each lineup competes with one or more lineups in one or more matchups, it is contemplated that the roster associated with each lineup may move up or down within the tier or division. It is contemplated that a user may engage in a plurality of matchups over a specified amount of time ("season competition"), at the end of which the present invention may provide for one or more playoffs. At the conclusion of the playoffs, the present invention may determine one or more users to be winners of one or more categories.

In some embodiments, it is contemplated that the present invention may provide for the user to select fantasy players based on real-life athletes in real-life sports, as well as real-life persons, objects, or things. By way of illustration and not limitation, it is contemplated that the present invention could not only provide for a user to draft a football player, but also that in certain embodiments a user could also draft a movie star, a politician, a car or truck, a storm or other natural occurrence, a horse, a concept such as a political opinion, or any other existing thing, animate or inanimate, capable of being ascertained by either a person or a machine (collectively, a "real-life player"). Although the present disclosure may describe the present invention in terms of sports, players, and sports-related performance, it is contemplated that similar concepts and metrics may apply to the other persons and things described in this section. By way of illustration and not limitation, in addition to a football player's performance in a football game, the present invention could also award points for the real-life performance of an actor as measured in terms of awards, the performance of a horse as measured in races won, the performance of a storm as measured in acres affected, or the performance of an idea as measured by polling data. In some embodiments, the real-life players available may have a value assigned to them, and this value may be determined based on the real-life player's performance during the real-life player's season.

It is therefore to be understood that terms such as "athlete," "sport," and "statistic" are herein used interchangeably with similar concepts such as "person" or "thing," "category" or "activity," and "measurable unit of data" as well as all concepts appropriate for similar substitution. By way of illustration and not limitation, the term "sport" as used herein denotes generally the arena or category in which the real-life player operates.

The present disclosure may provide that a user may select one or more fantasy players from the user's roster to be on the user's lineup, provided the real-life player is available to play that week. The present invention may then create a competition, or a matchup, between a user's lineup and another lineup. In a matchup, the present invention may provide that a lineup may accrue points based, in whole or in part, on one or more behaviors or results attributed to the real-life person or object, and the points may be awarded according to a system updated in real time by a deep learning algorithm. For example, by way of illustration and not of limitation, if a user selected baseball player Joe Smith to be in the user's lineup for that day, and the real-life Joe Smith hit a home run, then the user's Joe Smith would accumulate the points associated with a home run for the user. It is contemplated that different actions by the real-life Joe Smith, such as hitting a single or stealing a base, would have different point values for the user. Generally, the lineup that accrues more points than the other lineup will be declared the winner.

In some embodiments, the present invention may provide one or more divisions, each division comprising six tiers and a "Bullpen." Within each tier, the present invention may provide for twelve teams to compete with each other during a specified time period. By way of illustration and not limitation, a time period could be a day or a month. With twelve users in six tiers, it is contemplated that the present invention may provide for seventy-two active users within each division. It is further contemplated that in other embodiments the present invention may support an unlimited number of divisions, tiers, and users.

After a user forms a roster, the present invention may assign the user's roster to a tier within a division and provide for an initial matchup opponent. If the user wins the matchup, the present invention may move the user to a higher-level tier. If the user loses the matchup, the present invention may move the user to a lower-level tier. The present invention may repeat this sequence for each matchup. Furthermore, in some embodiments, when a user reaches one of the top three spots in a tier and wins again, the user may be moved to a higher tier. Conversely, in some embodiments, the present invention may provide that when a user reaches the bottom of a tier, or the bottom three spots in a tier, and loses again, the user may move down a tier. It is contemplated that in some embodiments the movement through tiers may be automatic and performed by the present invention according to one or more pre-set metrics. It is also contemplated that the naming conventions for each tier may reflect real-life categories within a particular sport. Using baseball as an example, the highest level tier could be named "Majors," the next-lower tier could be named "AAA," and down sequentially to "Rookie."

In some embodiments, when a roster reaches the lowest tier and then loses again, the roster in question may be moved to the "Bullpen." When in the Bullpen, a user may choose either active or inactive status. If the user selects active status (an "active user"), the active user may choose one or more of several options. First, the active user may choose whether or not to reenter season competition. If the active user so chooses, the present invention may provide that the active user's roster may be reinserted into the lowest tier that very day, the following day, or at a later date. It is contemplated that once reinserted into the lowest tier, the user may resume season competition.

However, if the active user decides to remain in the Bullpen, the active user may choose whether or not to compete with other active users in the Bullpen ("Bullpen competition"). In some embodiments, Bullpen competitions may resemble season competition matchups, but the present invention may provide that some or all points accrued in Bullpen competitions may not transfer to the user's tally in season competition. However, in some embodiments it is contemplated that any fantasy currency accrued in a Bullpen competition may remain associated with the user. It is contemplated, however, that in other embodiments the present invention may allow an active user to transfer Bullpen competition points to season competition, or treat fantasy currency obtained inside and outside the Bullpen differently, or may utilize any other treatment of points or fantasy currency capable of implementation by the present invention.

In some embodiments, the present invention may provide that at any time while using the present invention, a user's account may be debited if the user is active and elects to engage in one or more matchups or competitions. By way of illustration and not limitation, for example if a user in the Bullpen, whether active or inactive (an "inactive user"), decides not to compete, the present invention may not debit the active user's account. Conversely, if a user elects to engage in Bullpen competition or to reengage season competition, the present invention may debit the user's account. It is also contemplated that in some embodiments, the present invention may debit or credit a user's account in the form of real-life currency, fantasy currency, or a combination of real-life and fantasy currencies.

Remaining with the Bullpen, in some embodiments, an inactive user in the Bullpen may not be provided with the opportunity to compete against other users while in the Bullpen. In addition, again in some embodiments, the present invention may only reinsert active users, and hence may not reinsert inactive users, into season competition in the lowest tier. Thus, it is contemplated that in some embodiments, the Bullpen may operate as a waiting room, wherein a user may wait a period of time before reentering season competition, or the Bullpen may also operate as its own realm of competition.

In some embodiments, the present invention may provide for one or more playoff rounds at the conclusion of a season. In one embodiment, the first round of the playoffs may be comprised of the three highest-ranked rosters in each tier. It is contemplated that the first round of playoffs may comprise a system wherein each roster's playoff lineup may accrue points in the same manner as a season competition matchup, but wherein each playoff lineup's point totals are compared against the point totals for all other playoff lineups, and all playoff lineups and associated rosters may be ranked consecutively. The top fifty-percent of playoff lineups and associated rosters may move on to the second round of playoffs. The second round of playoffs may again pit all remaining rosters and associated playoff lineups against all other playoff lineups and rank each playoff lineup and associated roster based on total points awarded. It is contemplated that after the second round of playoffs have completed, the roster with the highest accumulated point total may be declared the overall winner, and the roster with the highest accumulated point total for a particular sport, activity, or category may be declared the winner for that particular sport, activity, or category.

It is also contemplated that the present invention may establish an additional final ranking, wherein all users are ranked according to a wider range of criteria than points alone. Such additional criteria may include, for purposes of example, the number of times a user moved up a tier, the number of prizes a user won, the number of playoffs the user made, as well as the number of points a user scored. It is contemplated that such a ranking system may encourage users to utilize the present invention in more than one sport.

As mentioned above, in some embodiments the present invention may provide and/or utilize a fantasy currency in addition to or in place of real-life currencies. In some embodiments, it is contemplated that users, via the present invention, may exchange real-life currency for fantasy currency. It is also contemplated that in some embodiments, users may accrue and spend the fantasy currency while practicing the present invention. It is further contemplated that in some embodiments, a user may be required to spend either real-life or fantasy currency in connection with an aspect of the present invention, such as by way of illustration and not limitation, before forming a roster, before or after participating in a matchup, before beginning the playoffs, or in association with any aspect of the present invention.

The present invention may also provide automated and affordable payment transaction options to users, wherein the present invention may charge users a fee via autodebit and may also allow users to easily cancel or alter one or more payment plans. The present invention may also bill, debit, or otherwise charge users in any manner capable of implementation by the present invention. The present invention may also allow users to activate or pause their account by choosing either an active or inactive status, respectively. The present invention may also provide for users to select their status on a daily basis. In certain embodiments, if a user selects active status, the present invention may put the user's lineup in play and debit the user's account a fee in either real-life currency, fantasy currency, or both. Or, the user could select inactive status, wherein the user's lineup may not be put in play and the user's account may not be debited. In some embodiments, a user may set the user's status to inactive at any time and avoid being debited.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

One or more of the above-disclosed embodiments, in addition to certain alternatives, are provided in further detail below with reference to the attached figures. The disclosed subject matter is not, however, limited to any particular embodiment disclosed.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 1:
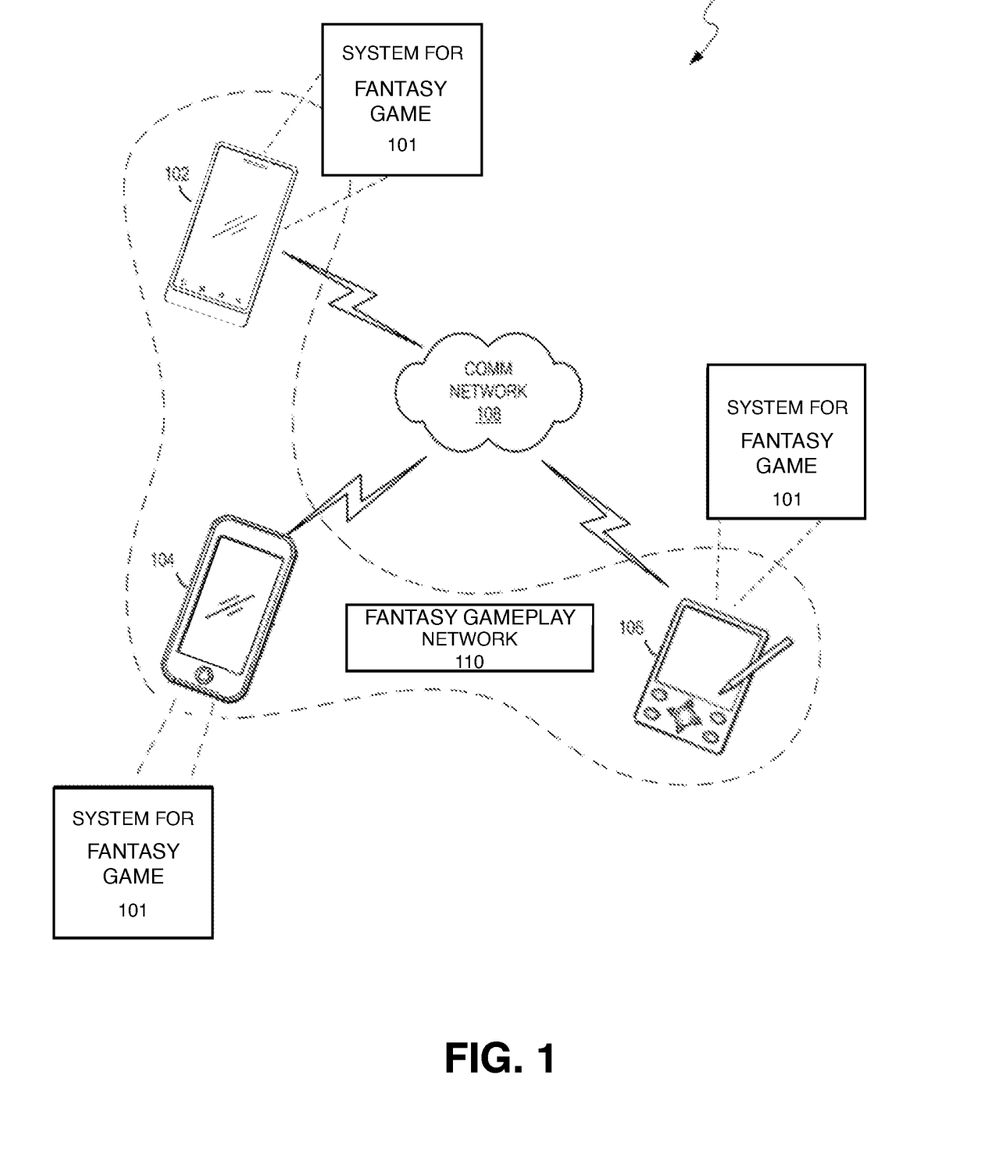
FIG. 1 is a block diagram of a networked environment in which an exemplary embodiment of a system for a fantasy game is implemented.

FIG. 1 illustrates an exemplary embodiment of the system 100 for a fantasy game which includes a plurality of mobile devices communicatively coupled to one another. By way of example, and not limitation, FIG. 1 illustrates three mobile devices 102, 104, and 106 communicatively coupled via a communication network 108. Each of the mobile devices may be embodied as a mobile computing device such as, for example and without limitation, a smartphone or tablet computer that incorporates cellular telephone functionality. Notably, the communications network can use one or more of various communications types such as, for example and without limitation, cellular, Bluetooth, and/or Wi-Fi communications.

Users of mobile devices 102, 104, and 106 may be users of a fantasy gameplay network 110 comprised of at least one existing network known to those skilled in the art. For instance, as noted above, the users of mobile devices 102, 104, and 106 may be communicatively linked via any one or a combination of a social networking network, an email network, a chat room, a webpage, or any system that utilizes the internet or wireless communications. Such a fantasy gameplay network 110 enables anyone, then, to use their devices 102, 104, and 106 to play fantasy games with each other. In this case, the system 100 utilizes an existing network to enable a user to play a fantasy game with one or more participants.

Returning to FIG. 1, a fantasy gameplay network 110 may be facilitated by a website that may require a registration and a login prior to use. However, regardless of how such a fantasy gameplay network is implemented, the functionality of concern involves the ability to set and play a lineup against one or more other users over the course of a season. In an embodiment, the fantasy gameplay network 110 may be made available to any user of any compatible network. In another embodiment, however, it is contemplated that the fantasy gameplay network 110 may be accessible to only limited members who subscribe.

Figure 2:
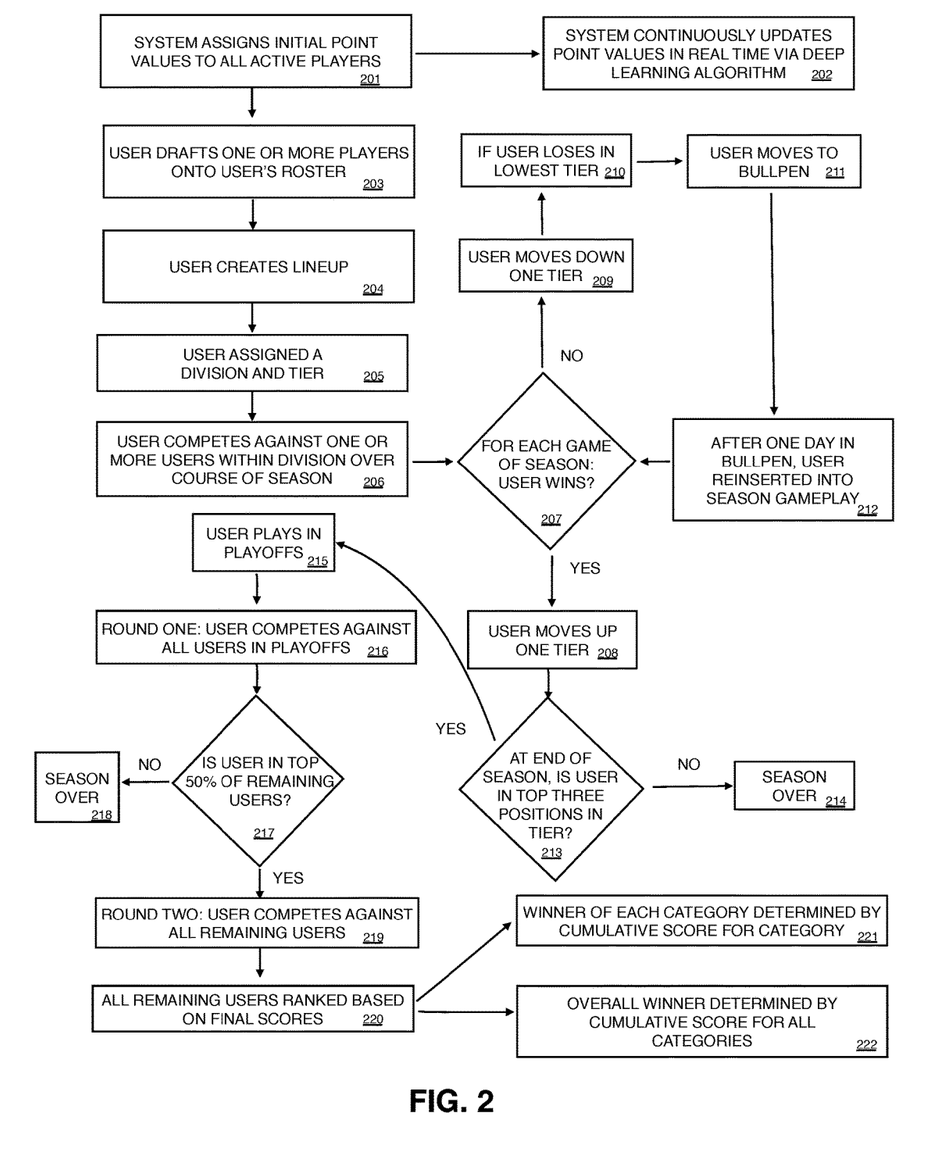
FIG. 2 is a flowchart depicting an exemplary embodiment of a method for a fantasy game which may be implemented by the system shown in FIG. 1.

Turning attention to FIG. 2, in some embodiments, the present invention may first identify all potential real-life players. The present invention may then determine what profile characteristics, if any, differentiate an "active" real-life player from an "inactive" real-life player. The present invention may then identify all real-life players in all categories, such as all sports and endeavors, whose profile characteristics enable the real-life player to be classified as active. The present invention may then create a database of all active real-life players and may assign an initial value to all active real-life players 201. It is contemplated that the initial value may be calculated based on, by way of illustration and not limitation, statistics such as a real-life player's past performance in the sport, days the real-life player was healthy during the relevant season, or perceived impact of the real-life player in question on teammates or opposing teams. In addition, with respect to real-life players who do not participate in a sport, it is contemplated that the present invention may provide for comparable aspects of the real-life player as appropriate to that real-life player's sphere of influence.

Continuing with FIG. 2, in some embodiments, the initial value may also include one or more projections of how the real-life player in question will perform in the future, for example, in an upcoming season. Such projections may be quantified as one variable amongst the statistics described above, may be considered a separate point value, or both. It is contemplated that in some embodiments, the present invention may set a real-life player's projected value. In some embodiments, it is contemplated that one or more users may set a real-life player's projected value. In some embodiments, it is contemplated that the present invention and one or more users may set a real-life player's projected value. One such example of such an embodiment could include a scenario wherein the present invention may provide more than one projected values for a real-life player, and one or more users may select from the projected values.

Remaining with FIG. 2, it is also contemplated that the present invention may continuously update a real-life player's value over the course of a season using a deep learning algorithm 202. It is contemplated that in some embodiments, this deep learning algorithm may commence its action immediately after the initial values have been set. It is contemplated that in such embodiments, the deep learning algorithm may take into account such factors as, by way of illustration and not limitation, developments to a real-life player's health, starting status, relationship to other players, performance in practice, or other factors. It is thus contemplated that, in some embodiments, a real-life player's value may be recalculated and updated in real time based on a multitude of factors even before the real-life player is selected by a user.

Continuing with FIG. 2, once one or more real-life players have been identified as active and given a value, one or more users may draft one or more fantasy players that correspond to one or more real-life players onto the user's team 203. The present invention may support one or more drafts methods.

One draft method supported by the present invention comprises identifying a group of users who may compete against each other over the course of a season, creating an order in which each user may select one or more fantasy players from an identified pool of fantasy players, and taking turns selecting fantasy players until each user has a certain number of fantasy players on their roster. In such a type of draft, each fantasy player may only be selected once.

Another draft method supported by the present invention comprises identifying a group of users who may compete against each other over the course of a season, creating an order in which each user will select one or more fantasy players from an identified pool of fantasy players, and taking turns selecting fantasy players until each user has a certain number of fantasy players on their roster. In such a type of draft, each fantasy player may be selected more than once.

In yet another draft method supported by the present invention, a user may select one or more fantasy players from an identified pool of fantasy players until the user has a certain number of fantasy players on the user's roster. In such a draft, the user may be committed to the user's roster for the duration of the season unless the user makes changes to the roster using one or more fantasy player swap protocols, such as for example, trading a fantasy player to another user's roster or receiving a fantasy player from another user's roster, or both.

In yet another draft method supported by the present invention, a user may select one or more fantasy players from an identified pool of fantasy players until the user has a certain number of fantasy players on the user's roster. In this draft method, the draft process may be repeated throughout the season, such as by way of illustration and not limitation, each day, week, or month. In some embodiments, the user may retain one or more fantasy players from a previous draft or season. In other embodiments, the user may create an entirely new roster each day, week, month, or season.

Remaining with FIG. 2, a user may create one or more lineups comprised of the players on the user's roster 204. With respect to the players in the user's lineup, the present invention may also limit the user's selections to a certain number of players per position or category, and may also limit the total number of players in a user's lineup.

Continuing with FIG. 2, with respect to bench players, in certain embodiments players on the bench may not accrue points towards the user's total for the relevant period. However, in some embodiments, the present invention may still calculate the points that these players would have been awarded, had the user started them, and may provide the user with these point calculations.

Remaining with FIG. 2, once a user has created a lineup, the user may be assigned a division and tier 205 within which to compete against other users. It is contemplated that in certain embodiments, a user may be assigned to or may select a division and tier at any time, such as by way of illustration and not limitation, from the time at which the user begins using the present invention to the time immediately prior to the beginning of playoffs. In some embodiments, the user may be assigned a division and tier upon creating a profile, whereas in other embodiments the user may be assigned a division and tier before drafting, and in other embodiments a user may be assigned a division and tier after the user has completed the user's draft.

Continuing with FIG. 2, the present invention may then provide for a season of fantasy gameplay 206, wherein a user competes with one or more other users in one or more matchups over the course a specified period of time. The present invention may support many different types of matchup formats and scoring methodologies.

One type of matchup supported by the present invention might resemble a "head to head" matchup, wherein one user competes against one other user on a specific day or over a specific period. In such an embodiment, the user's total score at the close of competition may be compared against the other user and the highest point total may win. For example, one of many possible embodiments might take place on each Saturday during a particular time period, wherein on that day the total scores for all fantasy players in a user's lineup might be compared against the total scores for all fantasy players in the other user's lineup as of the time when the competition closed, for example, at midnight.

Another type of matchup supported by the present invention might resemble a "one against all" matchup system, wherein within each tier, every user's scores may be compared against every other user's scores, and the user with the highest score may be declared the overall winner for the time period, for example, a week.

Another type of matchup supported by the present invention might resemble an accumulation matchup format, wherein a user's cumulative scores over the course of the season are compared against either one or many other users' cumulative scores. In such an embodiment, each week's winner may be the user with the highest point totals to that point in the season.

With respect to scoring, the present invention may support an overall points-based scoring system, wherein each player's point totals are added together to create an overall total for user's lineup during the time period, say for example, a week.

The present invention may also support a position-based point scoring system wherein the point totals for each player at a particular position are compared and the winner receives a point for winning that position. By way of illustration and not limitation, in such a scenario, if user A's tight end in football scored ten points and user B's tight end scored five points, user A might only get one point for winning the position, rather than the ten points the player actually scored.

Continuing with FIG. 2, the present invention may then repeat the matchup process repeatedly over the course of a season 207. In some embodiments, if a user wins the user's matchup, the user may go up one tier 208, and if the user loses the matchup, the user may go down one tier 209. If a user keeps losing and ends up in the lowest tier, and the user loses again 210, the user may be moved to Bullpen 211. In Bullpen 211, the user may be unable to play for one day, after which the user is inserted back into the lowest tier of the user's division 212 if the user's roster is active. The user may also make a series of choices 223 in Bullpen 211: the user may choose to remain inactive in Bullpen 211, may choose to be active and remain in Bullpen 211, or may choose to be active and participate in Bullpen competition. If and when a user returns to the lowest tier, once again if a user wins the user's matchup, the user may go up one tier 208, and if the user loses the matchup, the user may go down one tier 209, with the potential of eventually ending up in the Bullpen 211 once more.

Remaining with FIG. 2, in some embodiments, at the end of the season the present invention may provide for a playoff sequence. By way of illustration and not limitation and with respect to each user, the present invention may begin the playoff sequence by determining if the user is in the top three spots within the user's tier 213. If the user is not in the top three spots of the user's tier, the user's season may be over 214. If the user is in the top three spots of the user's tier, however, in some embodiments the user may play in the playoffs 215. In some embodiments, the present invention may provide that the scoring system used in the playoffs is the same as the present invention employed in the regular season. In some embodiments, the present invention may implement a different scoring system in the playoffs than was implemented in the regular season. In some embodiments, the present invention may allow one or more users to choose the scoring methodology that will be used in the playoffs.

Continuing with FIG. 2, the present invention may then provide for a user to compete with one or more other users in Round One of the playoffs 216, at the end of which, the present invention may determine whether or not a user was in the top fifty percent of all users playing in the playoffs 217. If the user is not in the top fifty percent of all users playing in the playoffs, the user's season may be over 218. If the user is in the top fifty percent of all users playing in the playoffs, the user may proceed to Round 2 of the playoffs 219 and compete against the remaining users using the same or different scoring methodology. At the completion of Round 2, the user's score may be compared against and ranked relative to the other users 220 who competed in Round 2.

Remaining with FIG. 2, after the playoffs, the present invention may declare one or more users to be a winner of a particular category. For purposes of illustration and not limitation, in some embodiments the present invention may determine which user had the overall highest point totals for a particular sport 221, for example, baseball. Also by way of illustration and not limitation, in some embodiments the present invention may declare an overall winner based on the user's cumulative point scores across all categories 222.

Figure 3:
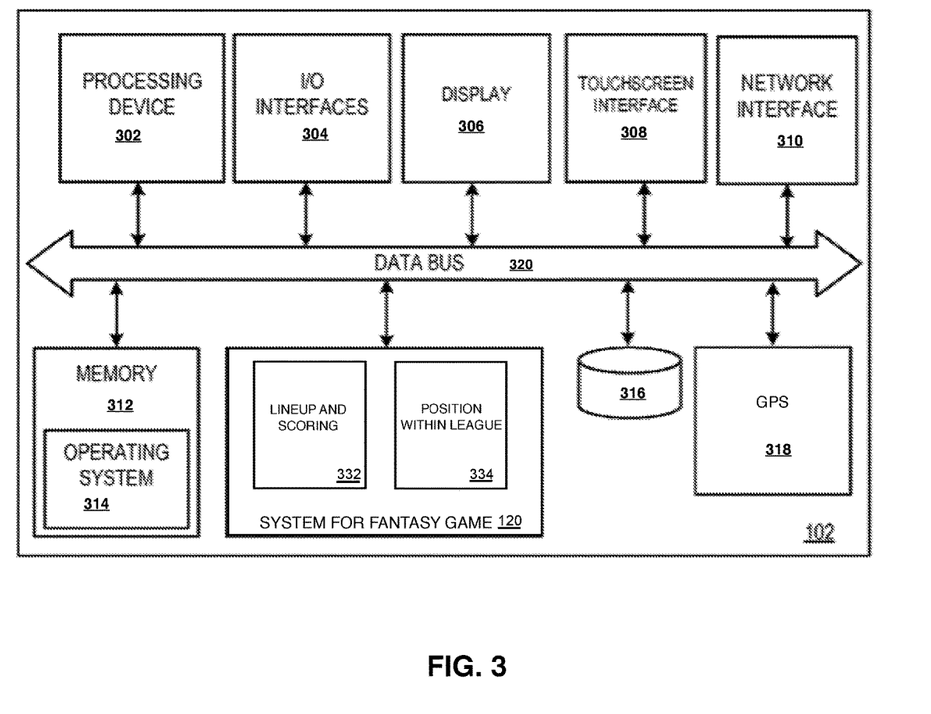
FIG. 3 illustrates an exemplary embodiment of a mobile device shown in FIG. 1.

FIG. 3 illustrates mobile electronic device 102 shown in FIG. 1. As described earlier, electronic, or simply mobile, device 102 may be a tablet computer or smartphone but may also be embodied in any one of a wide variety of wired and/or wireless computing devices. As shown in FIG. 3, mobile device 102 includes a processing device (processor) 302, input/output interfaces 304, a display 306, a touch-screen interface 308, a network interface 310, a memory 312, and operating system 314, a mass storage 316 and an GPS 318, with each communicating across a local data bus 320. Additionally, mobile device 102 incorporates a system for fantasy game 120, which is depicted as lineup and scoring 332 and position within league 334 although the location of information 332 and 334 could vary.

The processing device 302 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 312 can include any one of a combination of volatile memory elements (e.g., random-access memory (RAM, such as DRAM, and SRAM, etc.)) and nonvolatile memory elements. The memory typically comprises native operating system 314, one or more native applications, emulation systems, or emulated applications for any of a variety of operating systems and/or emulated hardware platforms, emulated operating systems, etc. For example, the applications may include application specific software which may comprise some or all the components of the mobile device 102. In accordance with such embodiments, the components are stored in memory and executed by the processing device. Note that although depicted separately in FIG. 3, the system and method for fantasy game 100 may be resident in memory such as memory 312.

Touchscreen interface 308 is configured to detect contact within the display area of the display 306 and provides such functionality as on-screen buttons, menus, keyboards, etc. that allows users to navigate user interfaces by touch. For some embodiments, the mobile device 102 will comprise GPS 318 or other means to determine the location of the mobile device 102.

One of ordinary skill in the art will appreciate that the memory 314 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 3, network interface device 310 comprises various components used to transmit and/or receive data over a networked environment such as depicted in FIG. 1. When such components are embodied as an application, the one or more components may be stored on a non-transitory computer-readable medium and executed by the processing device.

Figure 4:
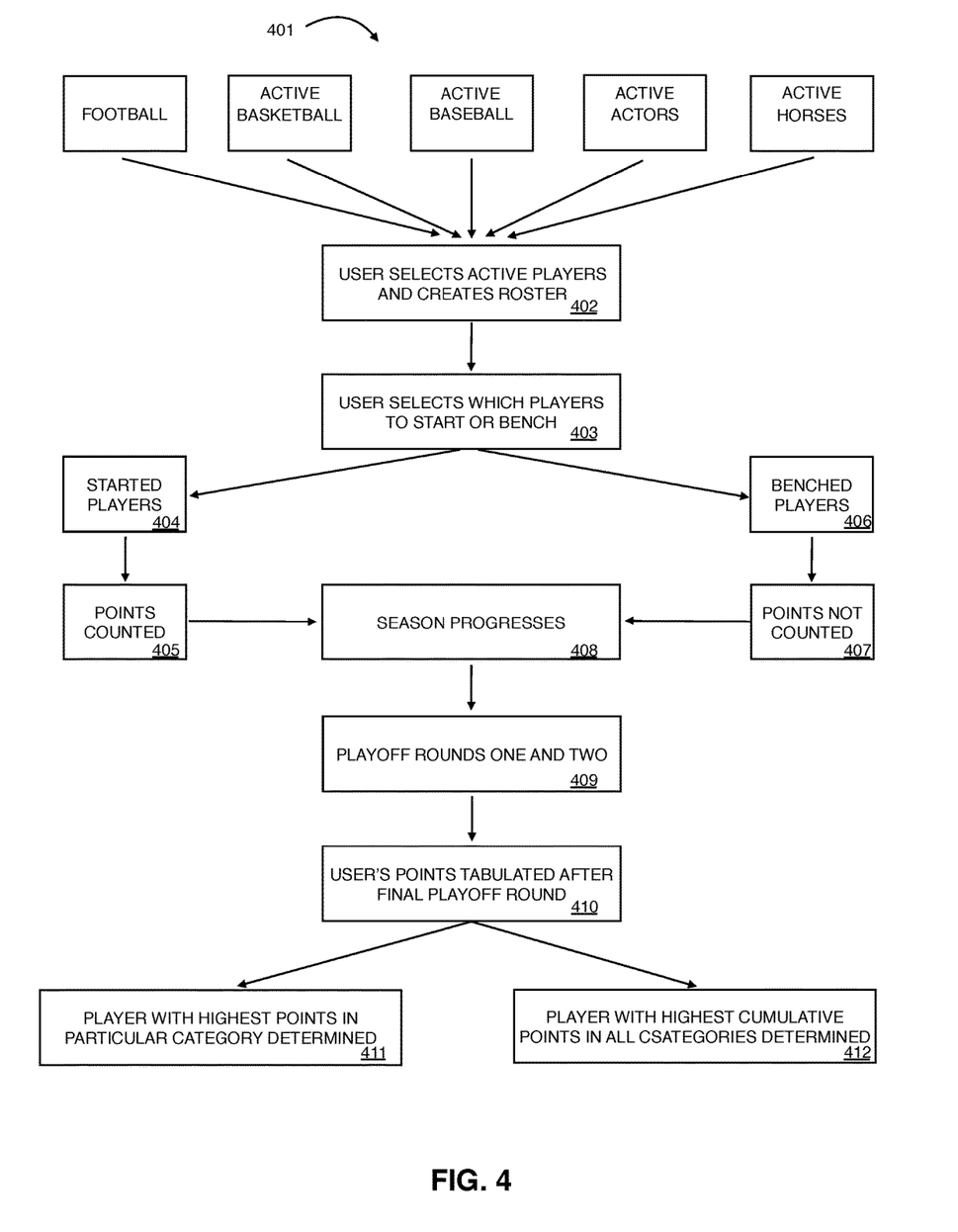
FIG. 4 is a block diagram illustrating an exemplary draft sequence for a system and method for a fantasy game in accordance with one embodiment of the present invention.

FIG. 4 is a block diagram illustrating an embodiment of the present invention wherein a user may select a roster and build a lineup. In the embodiment depicted, the present invention may first identify all active fantasy players and may assign initial values to each fantasy player 401. Then, a user may select any fantasy player from any category and may create the user's roster 402. After compiling a team roster, the user may select which fantasy players to start and which fantasy players to bench 403. For started fantasy players 404, the points earned by the performance of the corresponding real-life player may count towards the user's total 405. For benched players 406, the points earned by the performance of the corresponding real-life player may not count towards the user's total 407. The season may then progress 409. The present invention may then provide that a user may participate in Rounds One and Two of the playoffs 409, whereupon the user's point totals may be tabulated 410. With respect to all users of the present invention, the user with the highest point totals in a particular sport or other category may be deemed the winner of that sport 411 and may receive some form of recognition, such as by way of illustration and not limitation, a cash prize. With respect to all users of the present invention, the user with the highest cumulative point total in all sports combined may be deemed the overall or cumulative winner of the season 412 and may receive some form of recognition, such as by way of illustration and not limitation, a cash prize.

Figure 5:
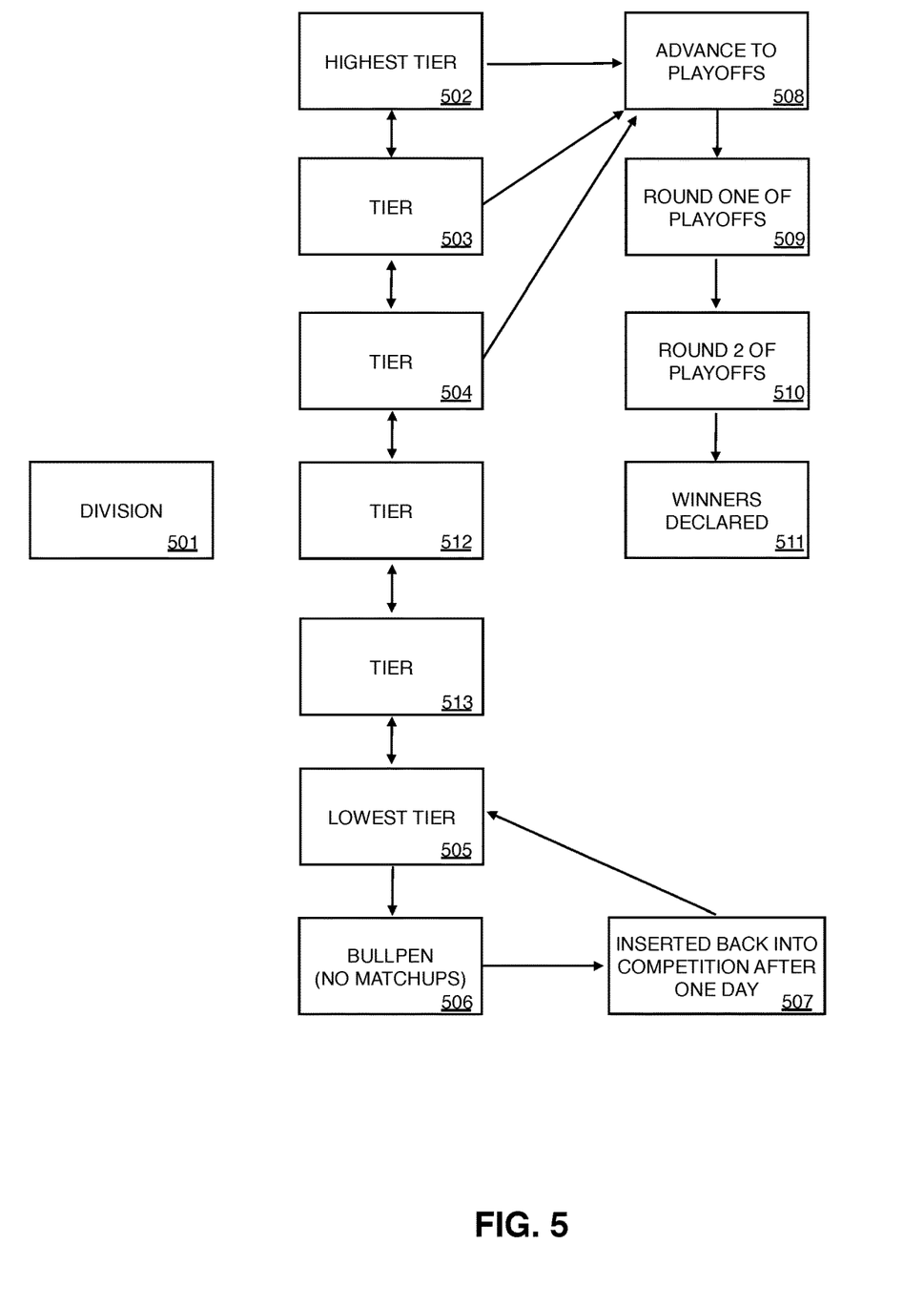
FIG. 5 is a block diagram illustrating an exemplary sequence of a system and method for a fantasy game in accordance with one embodiment of the present invention that generally discloses one possible sequence of league play.

FIG. 5 is a block diagram that generally discloses one possible sequence of league play in accordance with an exemplary embodiment of the present invention. In the embodiment depicted, a user may first be assigned to a division 501. Within the division, the user may also be assigned to a spot within a tier. For purposes of illustration and not of limitation, one of many possible tiers to which the user could be assigned is tier 512. When league play begins, a user may compete with one or more other users in a matchup that the user may either win or lose. For purposes of the present illustrative example, if the user wins, the user may move up a tier to tier 504. Conversely, if the user loses, in the present example, the user may move down a tier to tier 513.

Remaining with FIG. 5, if the user wins the first match and moves from original tier 512 to next tier up 504, then wins the following match, the user may move up to next-highest tier 503. If the user lost the first match and loses the second match as well, the user may move from original tier 512 to next lower tier 513 to lowest tier 504. Conversely, if a user should find themselves in next tier up 504, but lose the following match, the user may move down to original tier 512. As well, if a user should find themselves in next lowest tier 513 and win the next match, the user may move back up to original tier 512.

Continuing with FIG. 5, if a user should lose enough times to find themselves in lowest tier 505, and lose the next match, the user may be moved to Bullpen 506. Depending on a user's choices, a user may remain in the Bullpen as either active or inactive, and if active may choose to either participate in Bullpen competitions or not participate in Bullpen competitions. If the user chooses to be active and to return to season competition, the user may be reinserted into competition 507 at lowest tier 505 after a specified period of time, for example, one day. In addition, it is contemplated that in certain embodiments Bullpen 506 may operate as a "freemium" or free service to users, wherein a user may remain in Bullpen 506 without charge while the user is waiting to be reinserted into competition 507 at lowest tier 505. Alternatively, in some embodiments it is contemplated that a user may choose to remain in Bullpen 506 for a longer period of time than, purely for example, one day, in order to not accrue charges for utilizing the present invention's full suite of options.

Remaining with FIG. 5, it is contemplated that at the end of the season, users in the three highest tiers, depicted in FIG. 5 as highest tier 502 as well as tiers 503 and 504, may advance to the present invention's playoffs 508 and participate in Round One of playoffs 509. If a user is in the top 50% of users in the playoffs after the scores have been tabulated and compared for Round One 509, the user may advance to Round Two of playoffs 510. After Round Two 510 has completed, the present invention may tabulate the results of all remaining players and rank users in order based on at least two criteria: highest user score in a particular sport, for example football, and highest user score overall. The present invention may then declare these users to be winners 511.

In order to facilitate the aforementioned functionality, various aspects may be performed by one or more of the mobile devices 102, 104, and 106. In one embodiment, the mobile devices are operative to perform, at least in part, the method depicted in the flowchart of FIG. 3 and described above.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the electronic device 102, 104, or 106. The machine code may be converted from the source code, etc. If embodied in hardware, each block may represent a circuit or a number of interconnected circuits to implement the specified logical function(s).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; or (2) are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the present invention with which that terminology is associated. In general, the terms used in the following claims should not be constructed to limit the present invention to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the present invention is not intended to be exhaustive or limited to the precise form disclosed above or to a particular field of usage.

While specific embodiments of, and examples for, the system and method are described above for illustrative purposes, various equivalent modifications are possible for which those skilled in the relevant art will recognize.

While certain aspects of the system and method disclosed are presented below in particular claim forms, various aspects of the system and method are contemplated in any number of claim forms. Thus, the inventor reserves the right to add additional claims after filing the application to pursue such additional claim forms for other aspects of the present invention.

What is claimed is:

1. A non-transitory, tangible computer-readable medium having stored thereon computer- executable instructions, which, when executed by a computer processor, enable performance of the method comprising:
   identifying, at a mobile device, at least one real person or real object;
   designating, at the mobile device, at least one real person or real object as an active person or an active object;
   assigning, at the mobile device, a value to each active person or each active object;
   creating, at the mobile device, at least one fantasy player that corresponds to at least one active person or active object;
   drafting, at the mobile device, a plurality of fantasy players onto a plurality of rosters;
   providing, at the mobile device, a division having at least one tier;
   distributing, at the mobile device, the plurality of rosters into at least one tier;
   selecting, at the mobile device, a lineup associated with each roster;
   conducting, at the mobile device, a matchup sequence, wherein the matchup sequence comprises one or more of the steps of:
   a) selecting a first lineup and a second lineup; the first lineup and the second lineup being in competition with each other;
   b) determining a start time and an end time for the competition;
   c) assigning at least one numerical point value to each fantasy player in the first lineup and at least one numerical point value to each fantasy player in the second lineup, wherein each point value is based on one or more behaviors of the active person or active object to whom or which, respectively, each fantasy player corresponds;
   d) calculating a total numerical point value for the first lineup and a total numerical point value for the second lineup as of the end time, wherein the total point value for the first lineup is an aggregate of all assigned point values to the fantasy players in the first lineup and the total point value for the second lineup is an aggregate of all assigned point values to the fantasy players in the second lineup, and wherein each point value is updated continuously in real time by a deep learning algorithm;
   e) determining a winning lineup and a losing lineup as between the first lineup and the second lineup;
   repeating, at the mobile device, the matchup sequence for the duration of a season;
   conducting, at a conclusion of the season, a playoff sequence, wherein the playoff sequence comprises one or more of the steps of:
   a) ranking each roster in each tier;
   b) identifying each of any three highest-ranked rosters in each tier as a playoff roster;
   c) conducting a modified matchup sequence for all playoff rosters, wherein all playoff rosters are in competition with all other playoff rosters;
   d) determining a round one playoff ranking, wherein all playoff rosters are ranked relative to all other playoff rosters based on each playoff roster's total point value;
   e) determining, based on the round one playoff ranking, a top fifty percent of playoff rosters and bottom fifty percent of playoff rosters;
   f) eliminating the playoff rosters in the bottom fifty percent of playoff rosters;
   g) conducting a second modified matchup sequence for all playoff rosters in the top fifty percent of playoff rosters, wherein all playoff rosters in the top fifty percent of playoff rosters are in competition with all other playoff rosters in the top fifty percent of playoff rosters;
   h) determining a highest-ranked playoff roster, the highest-ranked playoff roster having the highest total point values of all playoff rosters as assigned in the second modified matchup sequence; and
   i) declaring the highest-ranked playoff roster the overall season winner.

2. The medium of claim 1, wherein the division has six tiers and a bullpen, the six tiers having an order, the order being highest to lowest, the bullpen being lower than the lowest tier, and wherein the bullpen is a holding area.

3. The medium of claim 2, wherein at the end of a day,
   any three lineups with the highest total numerical point values within their tier move up one tier;
   any three lineups with the lowest total numerical point values within their tier move down one tier; and
   any three lineups with the lowest point values within the lowest tier move into the bullpen.

4. The medium of claim 3, wherein a lineup in the bullpen is reinserted into the lowest tier.

5. The medium of claim 2, wherein twelve rosters are allocated to each tier.

6. A system for playing a fantasy game, comprising:
   an electronic device operative to:
   identify at least one real person or real object;
   designate at least one real person or real object as an active person or an active object;
   assign a value to each active person or each active object;
   create at least one fantasy player that corresponds to at least one active person or active object;
   draft a plurality of fantasy players onto a plurality of rosters;
   provide a division having at least one tier;
   distribute the plurality of rosters into at least one tier;
   select a lineup associated with each roster;
   conduct a matchup sequence, wherein the matchup sequence comprises one or more of the steps of:
   a) selecting a first lineup and a second lineup; the first lineup and the second lineup being in competition with each other;
   b) determining a start time and an end time for the competition;
   c) assigning at least one numerical point value to each fantasy player in the first lineup and at least one numerical point value to each fantasy player in the second lineup, wherein each point value is based on one or more behaviors of the active person or active object to whom or which, respectively, each fantasy player corresponds;
d) calculating a total numerical point value for the first lineup and a total numerical point value for the second lineup as of the end time, wherein the total point value for the first lineup is an aggregate of all assigned point values to the fantasy players in the first lineup and the total point value for the second lineup is an aggregate of all assigned point values to the fantasy players in the second lineup, wherein each point value is updated continuously in real time by a deep learning algorithm;
e) determining a winning lineup and a losing lineup as between the first lineup and the second lineup;

repeat the matchup sequence for the duration of a season;

conduct, at a conclusion of the season, a playoff sequence, wherein the playoff sequence comprises one or more of the steps of:

a) ranking each roster in each tier;
b) identifying each of any three highest-ranked rosters in each tier as a playoff roster;
c) conducting a modified matchup sequence for all playoff rosters, wherein all playoff rosters are in competition with all other playoff rosters;
d) determining a round one playoff ranking, wherein all playoff rosters are ranked relative to all other playoff rosters based on each playoff roster's total point value;
e) determining, based on the round one playoff ranking, a top fifty percent of playoff rosters and bottom fifty percent of playoff rosters;
f) eliminating the playoff rosters in the bottom fifty percent of playoff rosters;
g) conducting a second modified matchup sequence for all playoff rosters in the top fifty percent of playoff rosters, wherein all playoff rosters in the top fifty percent of playoff rosters are in competition with all other playoff rosters in the top fifty percent of playoff rosters;
h) determining a highest-ranked playoff roster, the highest-ranked playoff roster having the highest total point values of all playoff rosters as assigned in the second modified matchup sequence; and
i) declaring the highest-ranked playoff roster the overall season winner.

7. The system of claim 6, wherein the division has six tiers and a bullpen, the six tiers having an order, the order being highest to lowest, the bullpen being lower than the lowest tier, and wherein the bullpen is a holding area.

8. The system of claim 7, wherein at the end of a day,
any three lineups with the highest total numerical point values within their tier move up one tier;
any three lineups with the lowest total numerical point values within their tier move down one tier; and
any three lineups with the lowest point values within the lowest tier move into the bullpen.

9. The system of claim 8, wherein a lineup in the bullpen is reinserted into the lowest tier.

10. The system of claim 7, wherein twelve rosters are allocated to each tier.

* * * * *